(12) United States Patent
Kao

(10) Patent No.: US 6,773,127 B2
(45) Date of Patent: Aug. 10, 2004

(54) STRUCTURE FOR POSITIONING OPTICAL FILMS ON A BACK LIGHT MODULE OF DISPLAY

(75) Inventor: Hung-Chen Kao, Taoyuan Hsien (TW)

(73) Assignee: HannStar Display Corp., Tao-Yuan Hsien (TW)

( * ) Notice: Subject to any disclaimer, the term of this patent is extended or adjusted under 35 U.S.C. 154(b) by 0 days.

(21) Appl. No.: 10/337,779

(22) Filed: Jan. 8, 2003

(65) Prior Publication Data

US 2003/0231499 A1 Dec. 18, 2003

(30) Foreign Application Priority Data

Jun. 14, 2002 (TW) ...................................... 91208960 U

(51) Int. Cl.[7] .............................................. F21V 17/00
(52) U.S. Cl. ........................... 362/31; 362/26; 362/551; 362/581
(58) Field of Search ............................ 362/31, 26, 551, 362/555, 561, 581

(56) References Cited

U.S. PATENT DOCUMENTS 6,626,550 B2 * 9/2003 Choi ............................ 362/31

* cited by examiner

Primary Examiner—Alan Cariaso
Assistant Examiner—Mark Tsidulko
(74) Attorney, Agent, or Firm—Troxell Law Office PLLC

(57) ABSTRACT

A positioning structure of a back light module has an optical film and a frame, wherein at least one flange is respectively disposed at two corresponding edges of the optical film and the flange has a neck portion. The frame is used to position the optical film and includes base, a constraining block and a bridge, wherein the base is used to contain the flange of the optical film, and the constraining block protrudes from the surface of the base and corresponds to the neck portion of the flange so as to restrict displacement of the flange parallel to the surface of the base, and the bridge is mounted on the top of the base to constrain the displacement of the flange perpendicular to the direction of the surface of the base. In addition, appropriate gaps are retained both between the constraining block and the neck portion of the flange, and between the bridge and the flange such that the optical film can freely extend when it is heated to deform.

14 Claims, 4 Drawing Sheets

STRUCTURE FOR POSITIONING OPTICAL FILMS ON A BACK LIGHT MODULE OF DISPLAY

FIELD OF THE INVENTION

The present invention relates to an optical film of a back light module, more particularly, to a positioning structure which can avoid wrinkles of the optical film when heated.

BACKGROUND OF THE INVENTION

With rapid advancement of the fabrication technology of thin film transistors, a liquid crystal display (LCD) is largely applied in various electronic products such as a Personal Digital Assistant (PDA) device, a notebook computer, a digital camera, a video camera, and a mobile phone due to the fact it has advantages of smaller size, lighter weight, lower power consumption and low radiation. Moreover, since manufacturers aggressively invest in research & development and employ large-scale fabricating equipment, the quality of the LCD is unceasingly improved and the price thereof is continuously decreased. That promptly broadens the applied fields of the LCD.

Since the LCD is not a light-emitting display apparatus, it can only perform a display function with the aid of a back light module. Please refer to FIG. 1 illustrating a sectional view of the back light module 10. The back light module 10 comprises a light guiding plate 11, a reflective plate 12, a lamp 13, an optical film 14 consisting of a plurality of thin films and an aluminum back cover 15. The light guiding plate 11 is an injected or extruded acrylic sheet and circular, hexagonal or square pellet patterns as diffusion dots 16 for scattering light are formed by screen printing or direct injection on the bottom surface thereof. The reflective plate 12 is disposed beneath the light guiding plate 11 and can reflect the light entering into the bottom surface of the light guiding plate 11 so as to return the light to the light guiding plate 11 to increase utilization of light. The lamp 13 is disposed at the side of the light guiding plate 11 and is generally composed by a cold cathode fluorescent lamp (CCFL) and sends light out into the light guiding plate 11 in a manner of end illuminating. The optical film 14 is placed on the top surface of the light guiding plate 11 and the composition and function thereof will be described thereinafter. The aluminum back cover 15 is mounted at the bottom and the side of the back light module 10 for protecting the back light module 10 and the elements therein.

Referring to FIG. 2, which is a schematic sectional diagram of the optical film 14 of the back light module 10, the optical film 14 consists of a plurality of the thin films and is placed on the top surface of the light guiding plate 11. The thin films include a lower diffusion sheet 141, a prism sheet 142, a reflective polarizing film 142 and an upper diffusion sheet 144. The optical film 14 can be composed by appropriate thin films based on functions providing by the thin films and practical demands. Therefore, the composition of the thin films in FIG. 2 is merely one type of combinations of the optical film 14.

Since the optical film 14 is a thin film made of plastics and the thickness thereof is about between 0.1 and 0.2 mm, a positioning means is needed to fix the optical film 14 on the top surface of the light guiding plate 11 so as to avoid displacement or coming off resulting from transportation or assembly, and to reduce re-adjusting time of the optical film 14 during the back light module is assembled. Furthermore, when the back light module is conducted with a reliability test such as falling or vibration, etc., the optical film 14 is liable to displace and bad quality in appearances of pictures such as dark lines or bright lines is produced, if the fixing effect of the positioning means are not good.

Referring to FIG. 3, which is a schematic diagram (including a partially top view and a partially side view) of a positioning means for an optical film 30 in a first prior art, the optical film 30 is a rectangular planar thin film. At least one flange 33 is respectively disposed at two corresponding edges of the optical film 30, i.e. a first edge 31 and a second edge 32. By means of combination of the flanges 33 and the positioning means 34, the optical film 30 is fixed on the light guiding plate 11. In FIG. 3, two flanges 33a, 33b are respectively mounted near two ends of the first edge 31 of the optical film 30, and a flange 33c is mounted in the middle of the second edge 32. Certainly, the number and location of the flanges are merely one embodiment in the prior art. The optical film 30 can also have four flanges which are respectively disposed at the two edges of the optical film 30 in a manner of symmetry or other kinds of design. The positioning means 34 not only can carry the flanges 33 but also can has the function to fix the flanges 33 so as to prevent movement of the optical film 30.

In FIG. 3, troughs 341 are mounted at locations of the positioning means 34 corresponding to two flanges 33a, 33b. The height of the troughs 341 is exactly equal to the thickness of the optical film 30. Hence, after the flanges 33 of the optical film 30 is placed at the troughs 341, the flanges and the height of the troughs 341 are at the same level. Then, adhesive tapes 35 are stuck on the top surface of the flanges 33 to have the optical film 30 fixed indeed without displacement. Since the manner of fixing the positioning means 34 is to firmly fix the flanges 33 by the tapes 35 in the troughs 341, a relative displacement between the flanges 33 and the troughs 341 will not take place even if the temperature or humidity of the environment is changed. This results in unfree extension of any two sides of the optical film 30 due to fixation of the tapes, after the optical film 30 is heated. Hence, upwardly arched wrinkles will be produced in the middle of the optical film 30, and thus uneven brightness of the image pictures of the LCD will happen.

Referring to FIG. 4, which is a schematic diagram (including a partially top view and a partially side view) of a positioning means for an optical film 30 in a second prior art, the same portion of the positioning means as that of the first prior art will not be reiterated. In FIG. 4, a first flange 36 at the first edge 31 of the optical film 30 has a round aperture 361, and a second flange 37 along the direction of a Y axis has a slot 371. Certainly, the locations of the round aperture 361 and the slot 371 therein can be interchanged. A positioning pin 342 is mounted at a trough 341 of the positioning means 34 corresponding to the round aperture 361 of the first flange 36, and a guiding shaft 343 are mounted corresponding to the slot 371 of the second flange 37. The fixing manner of the positioning means 34 for the optical film 30 is to have the first flange 31 and the second flange 37 of the first edge 31 respectively disposed in the corresponding troughs 341, to have the positioning pin 342 and the guiding shaft 343 respectively inserted into the round aperture 361 and the slot 371, and to have a third flange 38 of the second edge 32 disposed in the corresponding trough 341. Furthermore, three bridges 39 are employed to respectively constrain the three flanges 36, 37, and 38 at the two edges of the optical film 30 in the troughs 341, wherein enough gaps are retained between the bridges 39 and the top surface of the optical film 30 to provide deformation space of the optical film 30 along the direction of a Z axis perpendicular to the surface of the optical film 30 after the optical film 30 is heated. Appropriate gaps are also retained between the positioning means 34 and the first and second edges 31, 32 of the optical film 30 to provide deformation space of the optical film 30 along the direction of an X axis after the optical film 30 is heated. In addition, the slot 371 of the second flange 37 mounted along the direction of a Y axis provides deformation space of the optical film 30 along the direction of a Y axis after the optical film 30 is heated.

Although the positioning means 34 in the second prior art has pre-retained gaps at the two edges of the optical film 30 as the deformation spaces when heated so as to prevent wrinkles or arches, since the round aperture 361 of the first flange 36 is tightly matched with the positioning pin 342, the pre-retained gaps therebetween is very small. Thus, the deformation of the optical film 30 along the direction of the X axis, after the optical film 30 is heated, can only extends to the direction of the second edge 32. At this time, if the pre-retained gaps between the positioning pin 342 and the second edge 32 of the optical film 30 are insufficient, it will lead to wrinkles or arches of the optical film 30. Contrarily, if the pre-retained gaps therebetween is to be sufficient, the bright lines will be produced on the pictures during the optical film 30 is unheated to deform due to the too large pre-retained gaps and the quality of the LCD is affected.

Therefore, how to invent a positioning structure for the optical film so as to overcome the problems confronted in the prior art is focused by the engineers which are engaged in research and development of the LCD.

SUMMARY OF THE INVENTION

The primary objective of the present invention is to provide a positioning structure for an optical film on a back light module of display, wherein the positioning structure can limit the movement range of the optical film so as to avoid wrinkles or arches of the optical film produced when it is heated, and to prevent bright lines of the LCD pictures produced to affect the quality thereof.

In the present invention, the positioning structure of a back light module comprises an optical film and a frame, wherein the optical film consists of a plurality of planar thin films and is disposed on the light guiding plate, and at least one flange is respectively disposed at two corresponding edges of the optical film, i.e. a first edge and a second edge. A neck portion with a narrower width than that of the flange is disposed at an appropriate location of the flanges. The frame is used to limit the displacement of the optical film and includes a base, a constraining block and a bridge, wherein the base can contain the flange of the optical film, and the constraining block protrudes from the surface of the base and corresponds to the neck portion of the flange so as to limit displacement of the flange parallel to the surface of the base. Moreover, the bridge is mounted on the top of the base to limit the displacement of the flange perpendicular to the surface of the base.

Unlike the prior art in which the flanges are tightly fixed, the feature of this invention resides in constraining the displacement range of the flanges by means of the gaps formed between the positioning structure and the flanges so as to achieve the objective of positioning. In the positioning structure of the present invention, an appropriate gap is retained between the constraining block and the neck portion of the flange, and an appropriate gap is also retained between the bridge and the flange. When the optical film suffering a temperature variation is deformed around, the flanges are constrained by the constraining block and the bridge and freely extend in the retained gap range. Since the gaps retained between the positioning structure and the flanges in this invention enable the optical film when not heated to deform to freely move therein and provide the optical film when heated in a certain temperature variation to deform so as to avoid wrinkles of the optical film resulted from the insufficient deformation space or to prevent the bright lines which affects the quality of pictures resulted from the too large deformation space retained in one of the directions. Therefore, the drawbacks of the prior art can be improved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The detailed description of a positioning structure for an optical film of a back light module which can limit the optical film in a range to avoid wrinkles of the optical film produced due to insufficient movement space when it is heated to deform in the present invention, is given for illustration by the following preferred embodiment.

Figure 1:
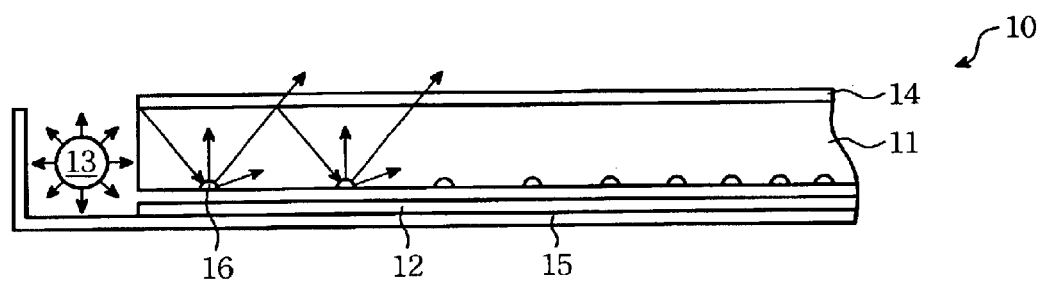
FIG. 1 is a sectional diagram of a back light module.
Figure 2:
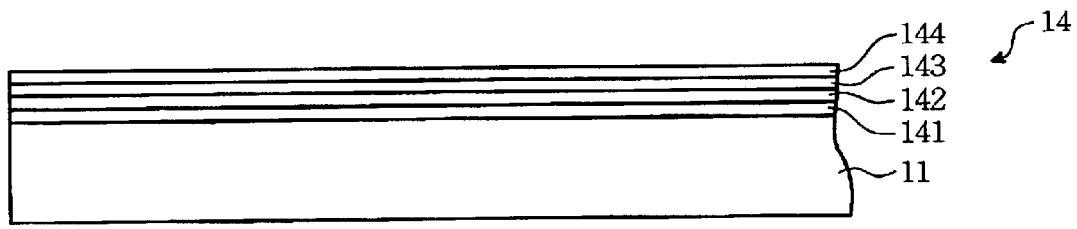
FIG. 2 is a is a schematic sectional diagram of an optical film 14 of the back light module in FIG. 1.
Figure 3:
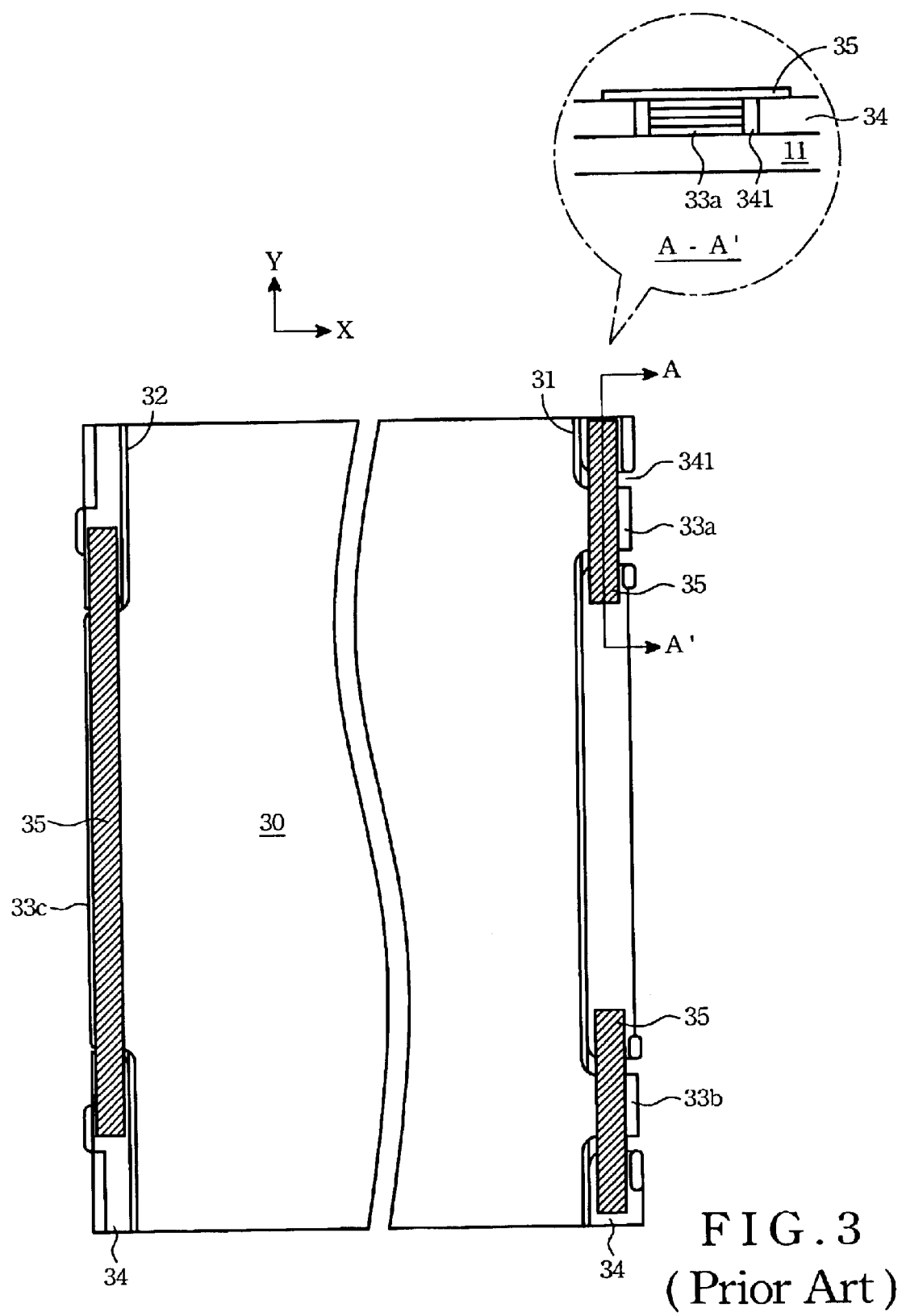
FIG. 3 is a schematic diagram (including a partially top view and a partially side view) of a positioning means for the optical film in a first prior art.
Figure 4:
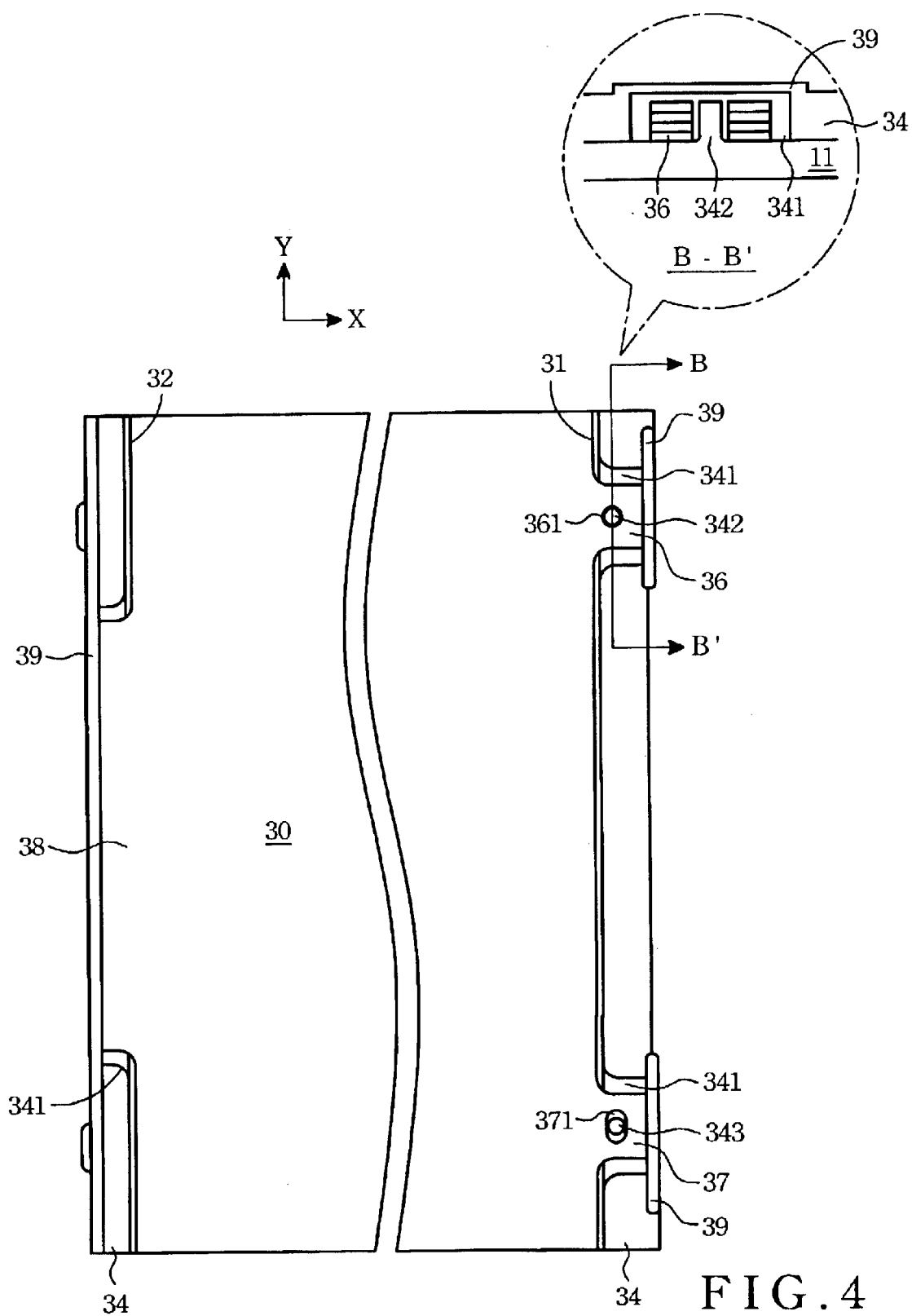
FIG. 4 is a schematic diagram (including a partially top view and a partially side view) of a positioning means for the optical film in a second prior art.
Figure 5:
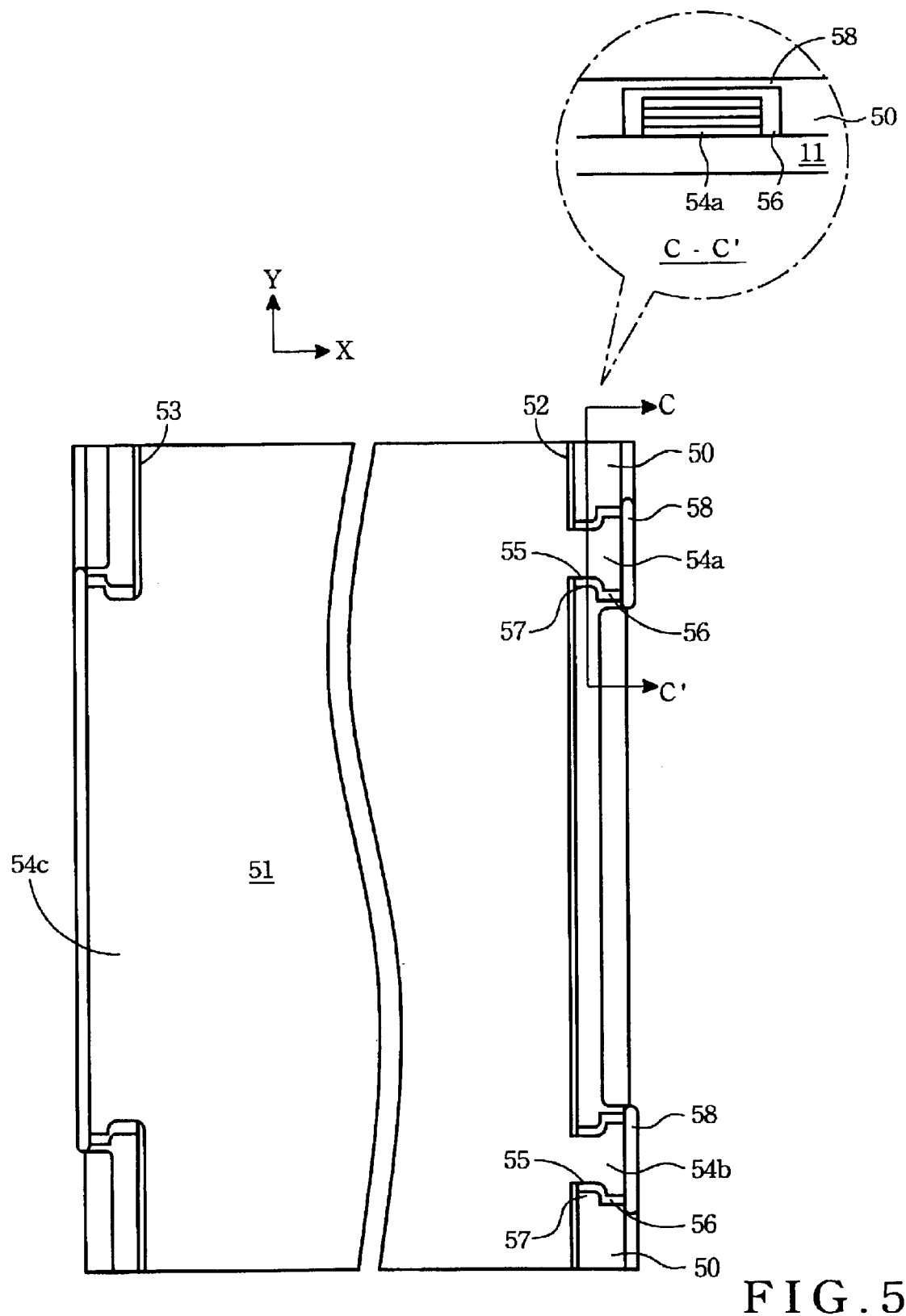
FIG. 5 is a schematic diagram (including a partially top view and a partially side view) of a positioning structure for an optical film of this invention.

FIG. 5 is schematic diagram (including a partially top view and a partially side view) of a positioning structure in accordance with one embodiment of the present invention. As shown in FIG. 5, the positioning structure comprises an optical film 51 and a frame 50, wherein the optical film 51 is disposed on the light guiding plate 11, and at least one flange 54 is respectively disposed at two corresponding edges of the optical film 51, i.e. a first edge 52 and a second edge 53. In this example, two flanges 54a, 54b are respectively mounted near two ends of the first edge 52 of the optical film 51, and a flange 54c is mounted in the middle of the second edge 53. Alternatively, two or more flanges can be respectively disposed at the two edges of the optical film 51 in this invention. A neck portion 55 is disposed at an appropriate location of the flanges 54 and the width of the neck portion 55 is smaller than that of the flange 54. Preferably, the neck portion is disposed in the middle of the flanges 54.

The frame 50 is disposed at outer edges of the optical film 51 and predetermined gaps are retained between the frame 50 and the outer edges of the optical film 51. The frame 50 includes a base 56, a constraining block 57 and a bridge 58, wherein the base 56 corresponding to the location of the flange 54, is a trough whose area is slightly greater than the flange 54 and whose depth is lightly greater than the thickness of the optical film 51. The constraining block 57 protrudes from the surface of the base 56 and corresponds to the neck portion 55 of the flange 55 so as to restrict displacement of the flange 54 parallel to the surface of the base 56 (the directions of X axis and Y axis). Hence, when the flange 54 of the optical film 51 is put in the base 56, it can merely move in a small range of the directions of X axis and Y axis due to restriction of the constraining block 57. Moreover, the bridge 58 is mounted on the top of the flange 54 and is integrated with the base 56 as a whole, and thus can limit the flange 54 in the base 56. Hence, the movement range of the optical film 51 in the horizontal (the directions of X axis and Y axis) is the predetermined gap retained between the flange 54 and the rim of the base 56. The gap between the flange 54 and bridge 58 is the movement range of the optical film 51 in the vertical (the direction of Z axis).

When the optical film is deformed around due to being heated to swell, the predetermined gaps retained between the optical film and the positioning structure enable the optical film to extend freely without restriction, and thus wrinkles will not happen on the surface of the optical film. Furthermore, unlike the second prior art in which the first edge of the optical film should be fixed and the optical film is only allowed to extend to the direction of the second edge, this invention uniformly distributes the retained gaps required for deformation of the optical film when heated, in the two edges of the optical film such that the retained gaps of the two edges will not be so large to produce bright lines in pictures.

In addition, in the above-mentioned embodiment of this invention, the predetermined gap retained between the optical film and the positioning structure is a deforming variation expectedly born by the optical film and the positioning structure when heated plus a fabrication tolerance between the frame and the optical film, wherein the deforming variation is calculated on the basis of a deformation formula when the object is heated, and the deformation formula is as follows:

Deforming Variation=length×thermal expansion coefficient×temperature variation, wherein the length depends on the design requirements of a product, and the thermal expansion coefficient is associated with the nature of materials, and the temperature variation is the difference between the normal temperature and the highest temperature expectedly endured by the product when designed.

As for the calculation of the fabrication tolerance between the frame and the optical film, considering that a positive tolerance or a negative tolerance might be produced during fabrication, a too large gap might be produced when the tolerance values of the frame and the optical film are directly added. However, in this invention, the squares of both of the tolerance values are added and the square root of the addition value is the desired fabrication tolerance which will not be too large, and moreover, either the positive tolerance or the negative tolerance after squared may not need to consider whether the tolerance is positive or negative. Therefore, the predetermined gap retained between the optical film and the positioning structure can be calculated in this invention based on the above-mentioned formula, that is the retained gap is greater than the addition of the deforming variation and the fabrication tolerance.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed:

1. A positioning structure of a back light module, comprising:

an optical film, comprising at least one flange respectively disposed at two corresponding edges thereof, and said flange comprising a neck portion having a narrower width than that of said flange; and a frame, used to position said optical film, and comprising:
a base containing said flange of said optical film;
a constraining block, protruding from a surface of said base and corresponding to said neck portion of said flange so as to limit displacement of said flange parallel to the surface of said base; and
a bridge, mounted on the top of said base, limiting displacement of said flange perpendicular to the surface of said base, wherein gaps as displacement space when said optical film is heated to deform are retained both between said constraining block and said neck portion of said flange, and between said bridge and said flange.

2. The positioning structure of claim 1, wherein said optical film consists of a plurality of rectangular planar thin films.

3. The positioning structure of claim 1, wherein gaps are retained between said positioning structure and the two edges of said optical film to provide the two edges of said optical film when heated to deform with extension space.

4. The positioning structure of claim 1, wherein said gap retained between said optical film and said frame is a deforming variation expectedly born by said optical film and said frame when heated plus a fabrication tolerance between said frame and said optical film.

5. The positioning structure of claim 4, wherein said deforming variation is associated with the sizes of said frame and said optical film, a thermal expansion coefficient and a predetermined temperature variation endured by said frame and said optical film.

6. The positioning structure of claim 4, wherein said fabrication tolerance between said frame and said optical film is the square root of the addition of the square of a tolerance value of said frame and the square of a tolerance value of said optical film.

7. The positioning structure of claim 1, wherein said bridge is integrated with said base in a piece.

8. A structure for positioning an optical film on a back light module of a display, comprising:

at least one flange disposed at an edge of said optical film, comprising a neck portion having a narrower width than that of said flange; and a frame, used to position said optical film, and comprising:
a base containing said flange of said optical film;
a constraining block, protruding from a surface of said base and corresponding to said neck portion of said flange so as to limit displacement of said flange parallel to the surface of said base; and
a bridge, mounted on the top of said base, limiting displacement of said flange perpendicular to the surface of said base, wherein gaps as displacement space when said optical film is heated to deform are retained both between said constraining block and said neck portion of said flange, and between said bridge and said flange.

9. The positioning structure of claim 8, wherein said optical film consists of a plurality of rectangular planar thin films.

10. The positioning structure of claim 8, wherein gaps are retained between said positioning structure and the two edges of said optical film to provide the two edges of said optical film when heated to deform with extension space.

11. The positioning structure of claim 8, wherein said gap retained between said optical film and said frame is a deforming variation expectedly born by said optical film and said frame when heated plus a fabrication tolerance between said frame and said optical film.

12. The positioning structure of claim 11, wherein said deforming variation is associated with the sizes of said frame and said optical film, a thermal expansion coefficient and a predetermined temperature variation endured by said frame and said optical film.

13. The positioning structure of claim 11, wherein said fabrication tolerance between said frame and said optical film is the square root of the addition of the square of a tolerance value of said frame and the square of a tolerance value of said optical film.

14. The positioning structure of claim 8, wherein said bridge is integrated with said base in a piece.

* * * * *